UNITED STATES PATENT OFFICE.

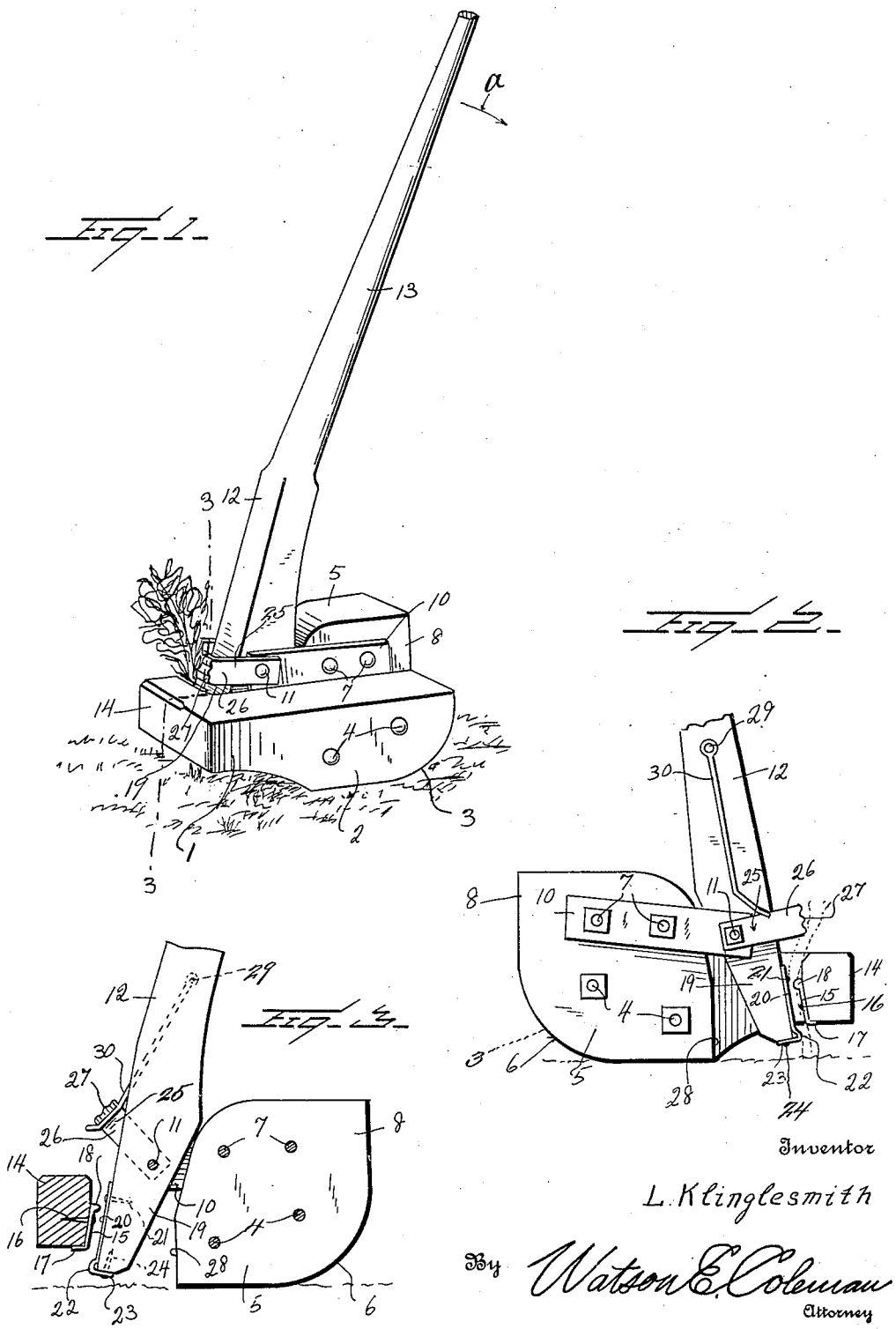

LEE KLINGLESMITH, OF CECILIA, KENTUCKY.

BUSH-PULLER.

1,321,316.  Specification of Letters Patent.  Patented Nov. 11, 1919.

Application filed June 4, 1919. Serial No. 301,624.

*To all whom it may concern:*

Be it known that I, LEE KLINGLESMITH, a citizen of the United States, residing at Cecilia, in the county of Hardin and State of Kentucky, have invented certain new and useful Improvements in Bush-Pullers, of which the following is a specification, reference being had to the accompanying drawings.

This invention relates to an improved implement for pulling or extracting bushes, weeds and the like from the ground or soil, and the invention aims to provide a device of this kind, which is very simple, efficient and practical in construction, and comprises novel features and design.

One of the features of the invention is the provision of a base member which engages the ground or soil and is provided with a fixed jaw, which extends laterally, in combination with a lever having a movable jaw, coöperating with the lateral fixed jaw of the base member, to clamp and extract the bushes, weeds and the like, when the base member is fulcrumed upon the ground.

Another feature of the invention is the provision of an abutment carried by the base member, against which the jaw of the lever engages, to limit said jaw in its open position.

Another feature of the invention is the provision of a clamping loop pivoted on the pivot pin of the lever, to coöperate with the bush when clamped between the loop and the fixed jaw, to insure a firmer grip upon the parts or stem of the bush or weeds or the like.

A further feature of the invention is the provision of means for holding the clamping loop in an inoperative position.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

Figure 1 is a perspective view of the improved bush or weed puller constructed in accordance with the invention showing the puller in position, in the act of extracting a bush or weed from the ground.

Fig. 2 is a view in elevation of the puller illustrating the side opposite to that shown in Fig. 1.

Fig. 3 is a sectional view on line 3—3 of Fig. 1, and illustrating the gripping loop supported in an inoperative position.

Referring more especially to the drawings, 1 designates a base member, which is of a general shape as shown, but may be any other suitable shape, if desired. This base member comprises the part 2, which has a rounded lower edge 3. By means of bolts 4, though not necessarily, in view of the fact that it is obvious that other means may be employed, a block member 5 is secured to the side of the part 2. This block member 5 also has a lower rounded edge 6, which with the rounded edge 3 engages the soil or ground, whereby the puller may have a fulcruming action on the ground, when extracting or pulling bushes, weeds and the like. It is to be noted that the block or member 5 protrudes upwardly beyond the upper edge of the part 2, and secured at 7 to this protruded portion 8, as shown are metallic straps or pieces 10. Extending through the end portions of the straps or pieces 10 (which may be constructed of any suitable material, preferably metal or the like) is a pivot bolt 11, on which a lever 12 is pivotally mounted. This lever is extended upwardly and is provided with a handle 13. The part 2 of the base is provided with a lateral jaw 14, one face of which has a gripping plate 15, which is secured to the jaw as shown at 16. This gripping plate has a flanged portion 17 extending under the jaw, and opposite the flange the gripping plate has a rib 18. It is to be noted that the short end of the lever 12 constitutes a movable gripping jaw 19, provided with a gripping plate 20, which is secured to the movable jaw 19 as shown at 21. This gripping plate 20 has an outwardly bulged rib 22, from which a flange 23 extends. This flange 23 is secured to the end face of the movable jaw 19, as shown at 24. It will be observed that when the movable jaw is closed that the rib of the gripping plate of the fixed jaw will engage the gripping plate of the movable jaw, while the rib of the gripping plate of the movable jaw will overlie the flanged portion of the gripping plate of the fixed jaw. When extracting bushes, weeds or the like from the ground, the base is arranged in position, the lever is manipulated, so as to open the movable jaw, so as to permit the trunk of the bush or the like to be inserted laterally between the fixed jaw and the movable jaw, the gripping plates thereof engaging on either side of the trunk. The lever is then moved in the direction of the arrow $a$, bringing the movable jaw 19 toward the fixed jaw, firmly gripping the trunk of the bush, weed or the like, at a point very close to the ground or soil. Owing to the ribs of the gripping plates of both jaws, a firm and secure grip may be attained on the stem of the bush. It will be noted that when sufficient pressure is applied on the lever in the direction of the arrow $a$, the base will fulcrum on the ground, and owing to the gripping action of the jaws on the stem of the bush or the like, the bush or the like may be easily extracted or pulled from the soil. In order to attain a firm grip on the stem of the bush, weed or the like an additional gripping member 25 is provided. This gripping member is in the form of a metallic loop, the arms 26 of which are pivoted upon the bolt 11. The outer face of the transverse part of this additional clamping loop is provided with teeth 27. The transverse toothed part of the additional gripping loop is so positioned relatively to the fixed jaw of the base, that when the stem of the bush or the weed or the like is positioned between the fixed jaw and the said toothed transverse part of the loop, a firm grip on the stem may be attained. It is to be observed that the greater the pressure on the lever, the firmer the transverse part of the gripping loop will bite on the stem of the bush or weed. The base member is provided with an abutment face 28, to be engaged by the rear portion of the movable jaw, to limit the movable jaw in its open position. Pivoted at 29 on the side of the lever is a hook 30, which is designed to engage the clamping loop, to hold it in an inoperative position, as shown in the drawing.

The invention having been set forth, what is claimed as new and useful is:

1. In a bush puller, the combination with a base provided with a fulcruming bearing edge, to engage the ground, of a pair of plates fixed to the base, said base having a laterally fixed jaw forward of the plates, a lever pivotally mounted between the plates and having its short end constituting a movable jaw in position opposing the fixed jaw, whereby a stem of a bush may engage between the jaws to be extracted, when pressure is applied upon the lever, a clamping loop pivotally mounted upon the pivot of the lever and provided with a transverse gripping portion having teeth, to insure an additional clamping action on the stem of the bush.

2. In a bush puller, the combination with a base provided with a fulcruming bearing edge, to engage the ground, of a pair of plates fixed to the base, said base having a laterally fixed jaw forward of the plates, a lever pivotally mounted between the plates and having its short end constituting a movable jaw in position opposing the fixed jaw, whereby a stem of a bush may engage between the jaws to be extracted, when pressure is applied upon the lever, a clamping loop pivotally mounted upon the pivot of the lever and provided with a transverse gripping portion having teeth, to insure an additional clamping action on the stem of the bush, means carried by the lever for holding the loop in an inoperative position, said base having an abutment, with which the rear portion of the movable jaw engages, to limit the movable jaw in its open position.

3. In a bush puller, the combination with a base provided with a fulcruming bearing edge to engage the ground, said base at its forward portion having a laterally extending fixed jaw, a lever, means carried by the base including a pivot pin on which the lever is mounted, said lever having a short portion constituting a movable jaw, said means being located on the base, whereby the movable jaw of the lever is positioned between a portion of the base and the fixed jaw, said jaws being opposed, means carried by the opposed faces of the jaws and having diagonally opposite gripping devices, to insure a firm gripping action on the stem of the bush, and a U-shaped clamping member mounted upon the pivot pin and having transverse gripping teeth to insure an additional clamping action on the stem of the bush when the U-shaped member is lowered over and adjacent the fixed jaw.

4. In a bush puller, the combination with a base provided with a fulcruming bearing to engage the ground, the forward part of the base having a laterally extending fixed jaw, a lever pivotally mounted on the base including a movable jaw in opposed relation to the fixed jaw, plates detachably secured to the adjacent faces of the movable and fixed jaws, said plates having ribs diagonally opposed for biting the stem of the bush, and means pivotally mounted upon the pivot of the lever and provided with gripping teeth and adapted to drop down adjacent the fixed jaw to insure an additional clamping action on the stem of the bush.

In testimony whereof I hereunto affix my signature in the presence of two witnesses.

LEE KLINGLESMITH.

Witnesses:
C. M. VERTREES,
J. R. COYLE.